United States Patent
Jou et al.

(10) Patent No.: US 8,116,968 B2
(45) Date of Patent: Feb. 14, 2012

(54) METHOD FOR IDENTIFICATION OF TRAFFIC LANE BOUNDARY

(75) Inventors: Yow-Jen Jou, Hsinchu (TW); Hsun-Jung Cho, Hsinchu (TW); Yu-Kuang Chen, Kaohsiung (TW); Heng Huang, Taipei County (TW); Chia-Chun Hsu, Taoyuan County (TW); Rih-Jin Li, Taipei (TW); Chien-Lun Lan, Kaohsiung (TW); Ming-Te Tseng, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 523 days.

(21) Appl. No.: 12/318,204

(22) Filed: Dec. 23, 2008

(65) Prior Publication Data

US 2010/0161204 A1 Jun. 24, 2010

(51) Int. Cl.
*G06F 19/00* (2011.01)
*G06G 7/70* (2006.01)
*G06G 7/76* (2006.01)
*G06G 1/00* (2006.01)

(52) U.S. Cl. .......... 701/117; 701/26; 701/300; 701/535; 708/309; 708/311; 340/907; 340/995.24; 342/27; 342/89; 342/90; 342/91; 342/98; 342/128

(58) Field of Classification Search .......... 701/41, 701/42, 117–119, 208–211, 300–302; 342/27, 342/28, 69–72, 89, 90, 91, 98–101, 109–117, 342/128; 340/907, 933–943
See application file for complete search history.

(56) References Cited

U.S. PATENT DOCUMENTS

| | | | | |
|---|---|---|---|---|
| 5,793,491 | A * | 8/1998 | Wangler et al. | 356/613 |
| 5,798,983 | A * | 8/1998 | Kuhn et al. | 367/135 |
| 6,556,916 | B2 * | 4/2003 | Waite et al. | 701/117 |
| 7,124,027 | B1 * | 10/2006 | Ernst et al. | 701/301 |
| 7,873,518 | B2 * | 1/2011 | Hentschel et al. | 704/256.1 |
| 2008/0272956 | A1 * | 11/2008 | Pedersen et al. | 342/107 |
| 2008/0278366 | A1 * | 11/2008 | Behrens | 342/109 |

* cited by examiner

*Primary Examiner* — Jack W Keith
*Assistant Examiner* — Rami Khatib
(74) *Attorney, Agent, or Firm* — Bacon & Thomas, PLLC

(57) ABSTRACT

The invention provides a method for identification of traffic lane boundary. Firstly the microwave signal is received, and the noise reduction is treated for the microwave signal. Then the frequency domain information is employed to calculate the legal set of closed interval, in order to form the frequency span information. Finally, the probability density function model is employed to calculate the frequency span information in order to identify the traffic lane boundary.

7 Claims, 8 Drawing Sheets

|        | Motorcycle | Compact car | Large car |
|--------|------------|-------------|-----------|
| Lane 1 | 8          | 35          | 1         |
| Lane 2 | 1          | 28          | 7         |
| Lane 3 | 7          | 37          | 10        |
| Lane 4 | 2          | 27          | 20        |

FIGURE 7

METHOD FOR IDENTIFICATION OF TRAFFIC LANE BOUNDARY

BACKGROUND OF THE INVENTION

1. Field of the Invention

The invention provides a method for identification of traffic lane boundary, particularly a method for identification of traffic lane boundary by applying the frequency span information and the probability density function model.

2. Description of the Prior Art

When the radar microwave detector is used to count the number of vehicles of every lane in multiple lanes at the same time, it has to set up the information of lane boundary first. It is a real difficult job. The main reason is that when the vehicles pass through different lanes, it is unable to distinguish lane boundary accurately to obtain the vehicle information on every lane, due to the reflection of microwave generated by near the adjacent lanes.

As the provided prior art for the other radar microwave technology application to the identification of traffic lane, in US Patent No. US2007/0016359A1 "Method and Apparatus for Providing Automatic Lane Calibration in a Traffic Sensor", Canadian EIS Company provides the central frequency of every lane, and assumed about five-meter width lane to conduct the upgrade and setup. The input is by using the displacement of a vehicle. The calculation of displacement is to calculate the distance between the central frequency of closest lane and a certain representative position, in order to modify the central frequency of lane constantly. However, the lane width is already been fixed in the technology. Due to the traffic lane being fixed, there is no more flexible calculation for lane width, so that it is still difficult for the practical application.

In addition, in U.S. Pat. No. 6,556,916B2 "System and Method for Identification of Traffic Lane Positions", the boundary of each lane is provided. After each car passing through, the appearance position having the most representative frequency of car plus 1 will be selected as the input. The accumulated figure is utilized for the learning of Gaussian Mixture Model, and the valley of learning is used as the lane boundary. The position of single point is used to represent the position of vehicle in the invention. It may cause a larger error in calculation, so that there is also a difficulty for the practical application.

Thus, in various conventional technologies for the radar identification of traffic lane, there are various shortcomings such as inaccuracy and lack of flexibility, and there are not suitable for the practical calculation of lane boundary. In order to respond the demand, it is necessary to develop the relevant technologies for identification of traffic lane positions, so as to save the cost such as manpower and time etc. and be able to obtain the correct lane width.

SUMMARY OF THE INVENTION

The invention provides a method for identification of traffic lane boundary. The microwave signal is received first, and the noise reduction is treated for the microwave signal. Then the frequency domain information is employed to calculate the legal set of closed interval, in order to form the frequency span information. Finally, the probability density function model is employed to calculate the frequency span information in order to identify the traffic lane boundary.

In the invention, the voltage signal is used as input parameter, which is converted to frequency domain signal by Fourier Transformation further. When the vehicle passes through the detecting area, the peak count is revised properly to find out the occupied frequency span. It is repeated to accumulate the frequency span information. The conflict of frequency span information is used to revise the accumulated figure. Finally, the revised Gaussian Mixture Model is utilized for learning. If there is a conflict point in two lanes, the conflict point and the learning result are used to determine lane boundary simultaneously. If there is no conflict point, only the learning result is used to determine lane boundary.

The invention utilizes the Gaussian Mixture Model Variant to carry on an automatic learning mechanism, in order to identify the proper lane boundary position.

The invention can reduce the wrong judgment in unknown lane area under the situation of a given frequency span information.

The invention can use a faster and more accurate calculation way to identify the lane boundary position, in order to get correct lane width.

The advantage and spirit of the invention can be understood further by the following detail description of invention and attached Figures.

BRIEF DESCRIPTION OF THE DRAWINGS

The foregoing aspects and many of the attendant advantages of this invention will become more readily appreciated as well becomes better understood by reference to the following detailed description, when taken in conjunction with the accompanying drawings, wherein:

FIG. 7 shows the statistical result of the accumulated vehicles table.

DESCRIPTION OF THE PREFERRED EMBODIMENT

The invention provides the frequency span information and the probability density model to form an automatic learning mechanism, in order to identify the correct lane boundary position.

Figure 1:
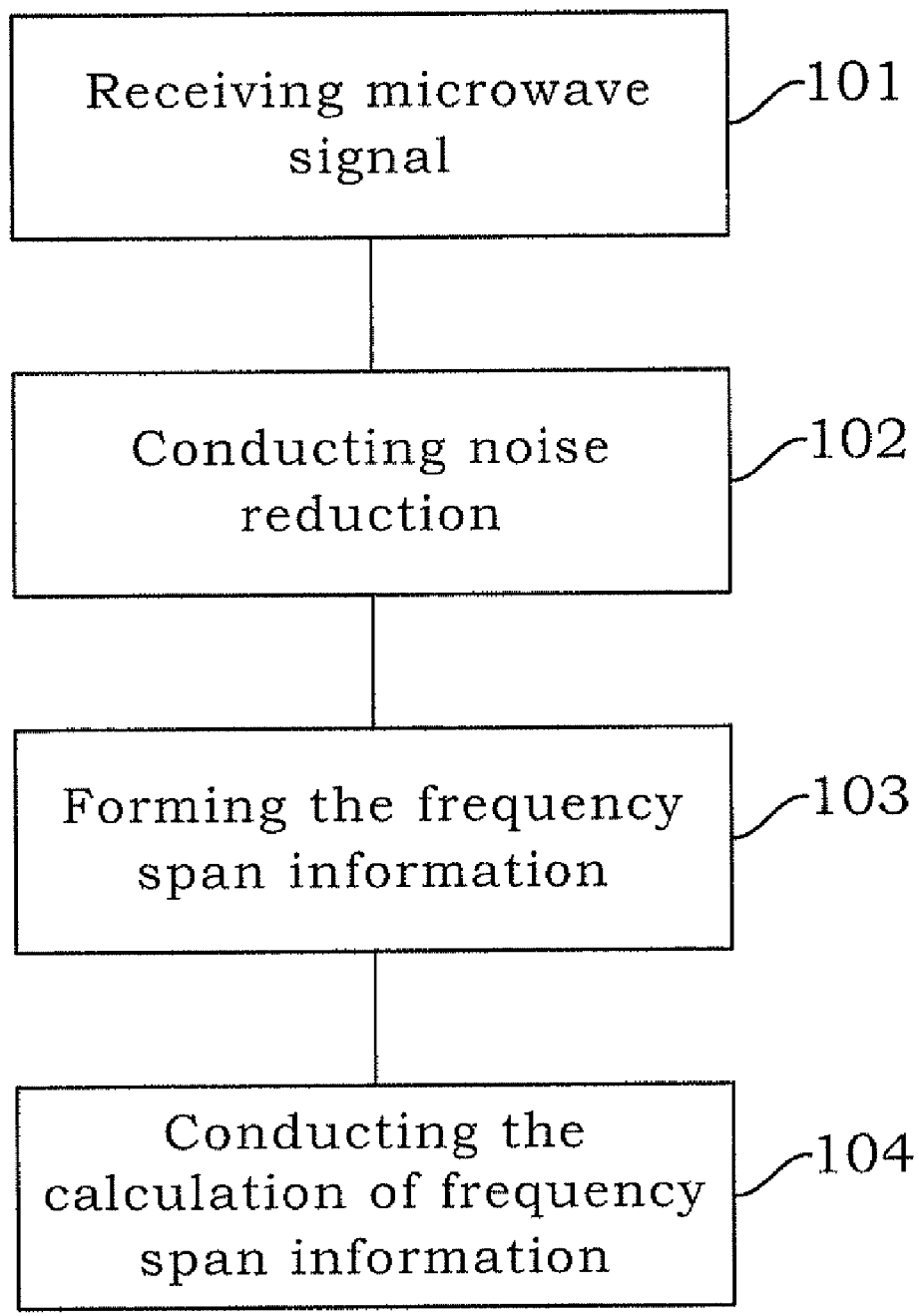
FIG. 1 shows the flow chart diagram of a preferred embodiment of the invention.

The invention provides a method for identification of traffic lane boundary, which is described in detail as follows:

FIG. 1 shows the flow chart of a preferred embodiment. As shown in Step 101, the microwave signal is received firstly, and then the voltage signal is converted to frequency domain information by Fourier Transformation.

As shown in Step 102 of FIG. 1, the noise reduction is treated for the frequency domain information. Thus, the unnecessary frequency domain information from the microwave signal is filtered.

As shown in Step 103 of FIG. 1, the frequency domain information is employed to calculate the legal set of closed interval, in order to form the frequency span information.

Finally, as shown in Step 104 of FIG. 1, the probability density model is employed to calculate the accumulated frequency span information, in order to identify the traffic lane boundary.

In the preferred embodiment of the invention, as shown in Step 101, the microwave signal is received first. The road-side radar detector is usually used to detect the vehicle on road. After the vehicle has passed, an electronic signal is generated. After the electronic signal is transformed, the frequency span information is formed.

The above-mentioned frequency span information is mainly to find the minimum closed interval formed by vehicle on the frequency domain. The peak count of vehicle on the frequency domain is used to select the closed interval. The clustering result is formed by the temporal continuity of vehicle, which is not a single sample point. In other words, the lane width (interval information) is employed to substitute the position information (single point information) of vehicle in the lane.

Figure 2:
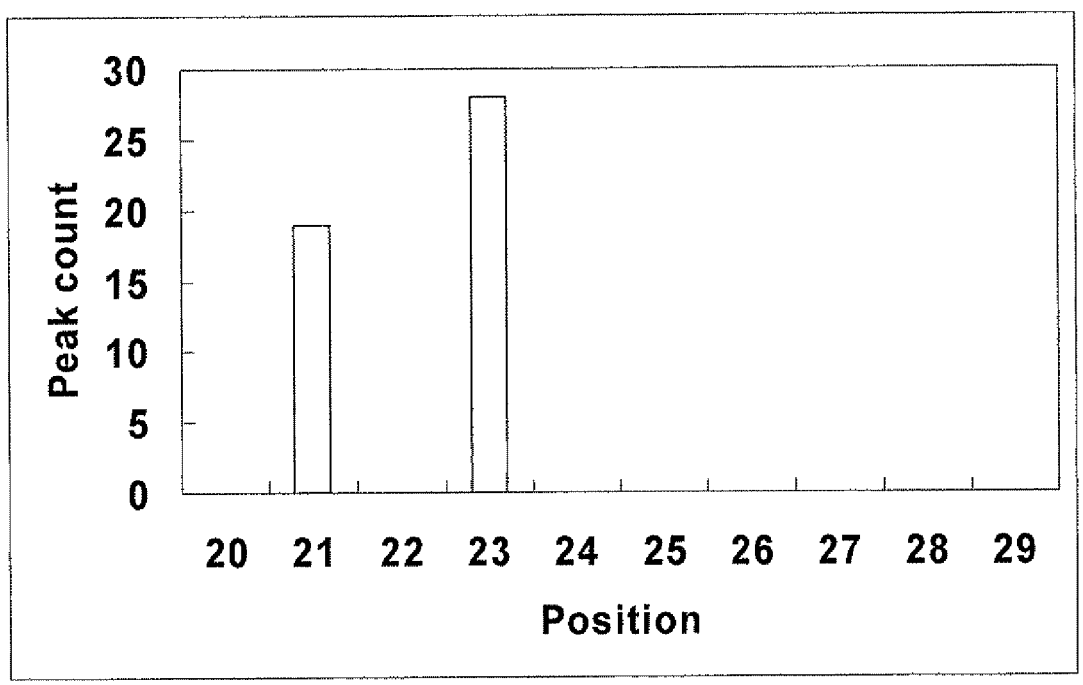
FIG. 2 shows the histogram for the peak count of compact car on Lane 1.

FIG. 2 shows the statistical diagram for the peak count on the frequency domain information after the small vehicle passing. As shown in FIG. 2, the minimum closed interval of system is [21, 23] because the peak counts of 21, 23 are quite representative. Also, they are close enough, thus the histogram of these peak counts can form the frequency span information of [21, 23].

Figure 3:
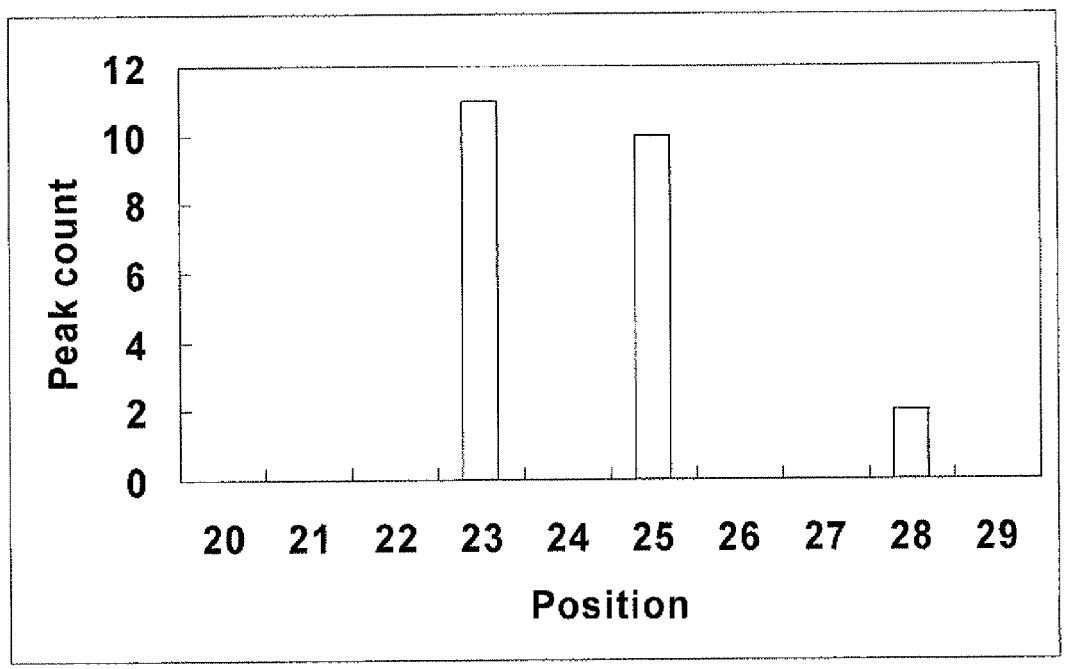
FIG. 3 shows the histogram for the peak count of large car on Lane 2.

FIG. 3 shows in another time point, after the big vehicle passing, the statistical diagram for the peak count on the frequency domain information. As shown in FIG. 3, the minimum closed interval of system transforming is [23, 27].

Figure 4:
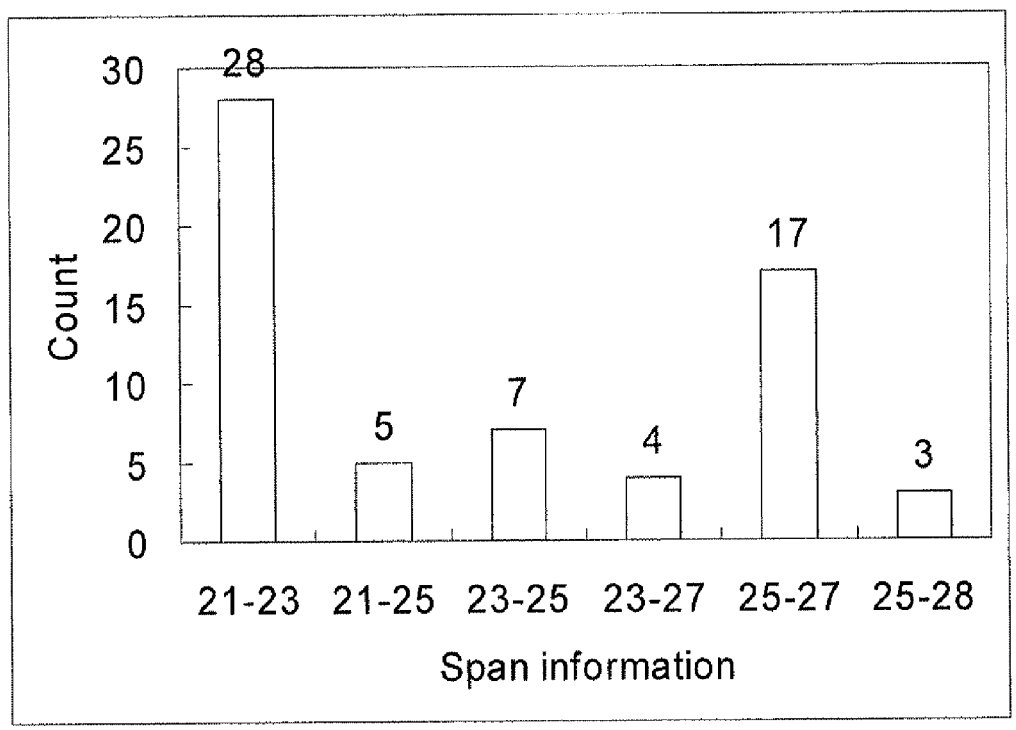
FIG. 4 shows the conflict information table.

FIG. 4 shows the histogram of frequency span information.

As shown in Step 102 of FIG. 1, the noise reduction is conducted firstly. When the vehicle passes, the peak count will be accumulated on the frequency domain. When the peak count is smaller than a certain threshold (such as smaller than 5% of peak count), the information on the frequency domain will be filtered.

As shown in Step 103 of FIG. 1, the frequency domain information is employed to calculate the legal set of closed interval. When the legal set of closed interval is calculated, it is necessary to check whether the distance of two closed intervals is smaller than the threshold (such as 1 meter). If it is not, these two closed intervals will be considered as different closed intervals. If it is, a minimum closed interval will be formed to cover the frequency domain of these two peak counts. Then, check again whether the distance of other closed intervals is smaller than the threshold (such as 1 meter). If it is, a larger minimum closed interval will be formed to cover previous closed interval and frequency domain, until no more other peak count can be merged. When the above-mentioned actions are completed, it is necessary to check all closed intervals and the single existed frequency domain alone. If the closed interval or the single existed frequency domain is smaller than the threshold (such as 1 meter) or larger than maximum lane width (such as 5 meters), the closed interval and the single existed frequency domain shall be deleted.

In addition, when the distance comparison of closed intervals is proceeded, the boundary of adjacent closed intervals will be compared, for example, the distance between [21, 23] and [25, 27] is 2 (25–23).

The invention screens out suitable frequency span information by limiting the maximum extent of lane, for example, the frequency span information must be less than the width restriction of normal lane to filter the suitable frequency span information.

Due to the single point information is employed to represent the traffic lane position; it is apt to generate the same expression way for different vehicles in different lanes; thus the invention utilizes the frequency span information. The greatest advantage is that the adverse effect can be avoided when the situation happened for the single point signal, in order to reduce the misleading judgment for the unidentified lane area.

Figure 5:
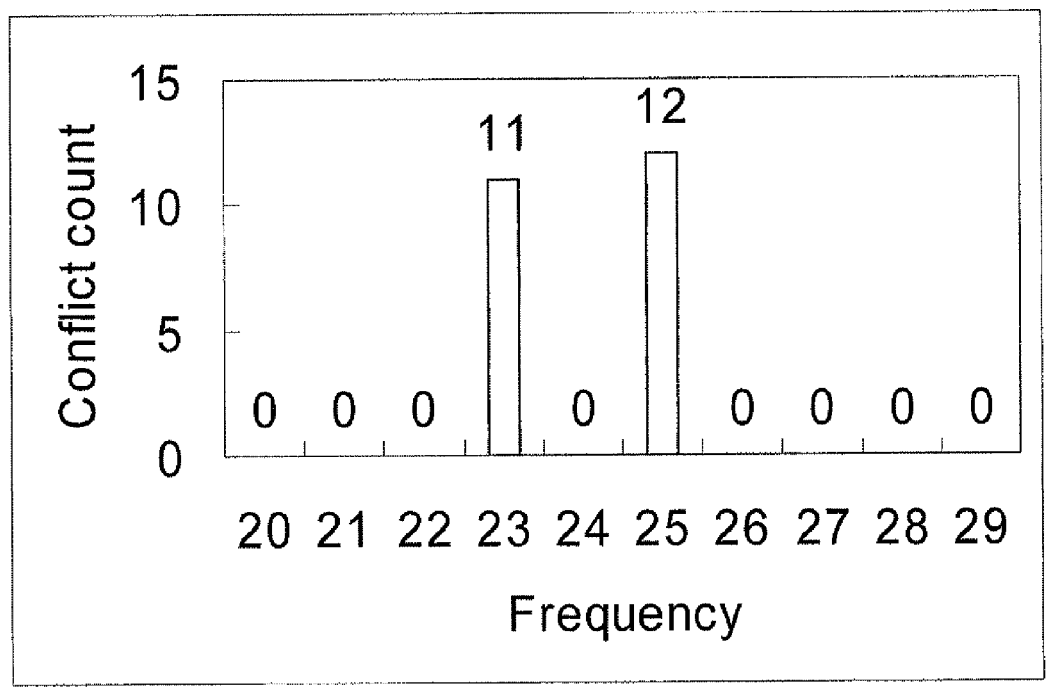
FIG. 5 shows the conflict information is taken place.

Then, the invention will carry on the treatment of conflict information, in order to judge the accumulated frequency span information adjusted by the traffic lane boundary. FIG. 4 shows the statistical histogram of the accumulated frequency span information. As for the treatment step of conflict information, it is mainly to observe whether the left boundary and right boundary of every frequency span information is overlapped. If there is overlap phenomenon, the conflict information needs to be calculated and treated. For example, it is shown in FIG. 5 that the closed interval 23 of span and the closed interval of span 25 will be the place where the conflict information is taken place in FIG. 4. At this moment, the invention will assert that it is the conflict information between the closed interval 23 of span and the closed interval 25 of span, which can be employed to adjust and treat the accumulated frequency span information.

Figure 6:
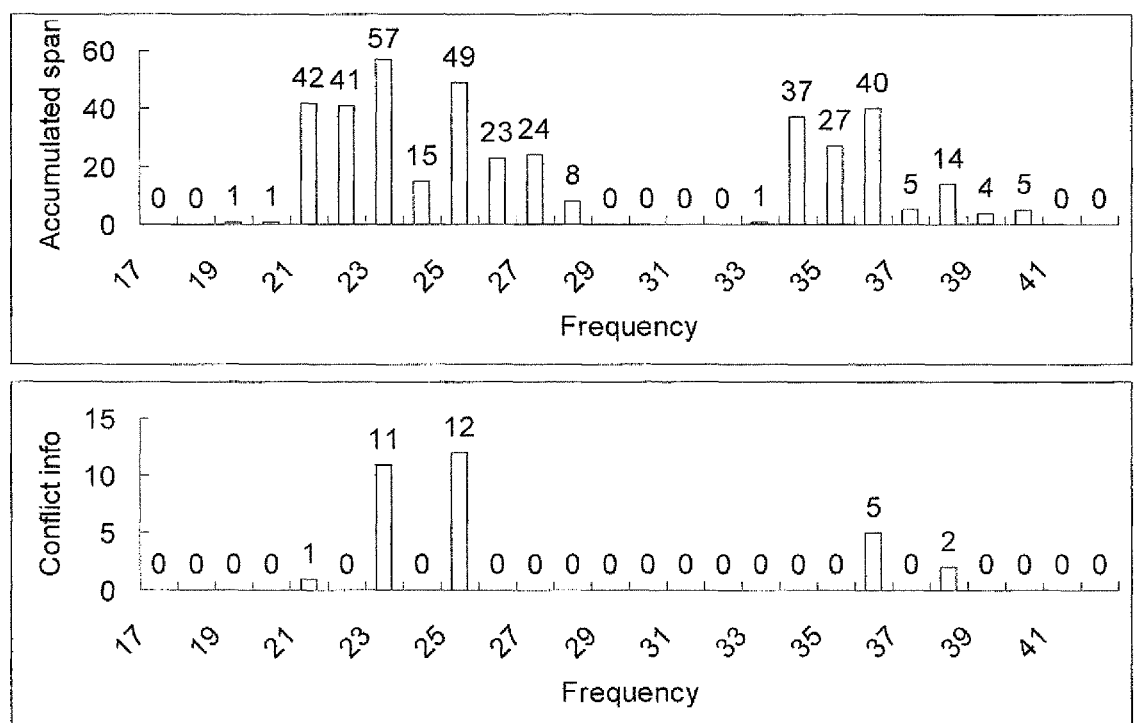
FIG. 6 shows the diagram of conflict information and the accumulated frequency.

The conflict information is calculated by the following way. Assume the span of certain frequency span information is started from position l to position r, and then a value will be added to L[l] and R[r]. Thus the result of FIG. 5 can be obtained by equation (1) as follows:

$$C_i = \min\{L[i], R[i]\} \tag{1}$$

Where $C_i$ represents the conflict times of conflict information at position i. This conflict information can be used by equation (2) to adjust the accumulated frequency span information. As shown in FIG. 6, after the adjustment, the accumulated frequency span information can respond the traffic lane position better.

$$A_i = \{A_i - C_i\} \tag{2}$$

Then, as shown in Step 104 of FIG. 1, the probability density function model and the Gaussian Mixture Model Variant are employed to calculate the frequency span information as follows:

$$p(x \mid \Theta, E_k) = \sum_{m=1}^{M} \alpha_m g\left(x; \mu_m, \sum_m, E_k\right), \tag{3}$$

Where $\alpha_1$ to $\alpha_m$ represent non-negative weight. The total sum is 1, $\mu_m$ is mean value, $\sigma_m$ is the Gaussian parameter of $M_{th}$.

$E$-Step: \hfill (4)

$$J(\Theta) = \ln\left[\prod_{i=1}^{N} p(x_i \mid \Theta, E_k)\right]$$

$$= \sum_{i=1}^{N} [\ln p(x_i \mid \Theta, E_k)]$$

$$= \sum_{i=1}^{N} \ln \begin{bmatrix} \alpha_1 g\left(x_i; \mu_1, \sum_1\right)\delta_{i1} + \\ \alpha_2 g\left(x_i; \mu_2, \sum_2\right)\delta_{i2} + \ldots + \\ \alpha_M g\left(x_i; \mu_M, \sum_M\right)\delta_{iM} \end{bmatrix}.$$

$|X_j|$ represents the set size of component j, that is $$X_j = \left\{\bigcup_{i=1}^{n} x_i \delta_{ij}\right\} \setminus \{0\} \text{ and } \bigcup_{j=1}^{M} X_j = \{x_i\}_{i=1}^{N} \quad (5)$$

Place equation (5) into equation (3), $$J(\Theta) = \sum_{j=1}^{M} \sum_{k=1}^{|X_j|} [\ln \alpha_j g(x_k; \mu_j, \Sigma_j)] \quad (6)$$

Maximize equation (6) to obtain $\alpha_j, \mu_j, \Sigma_j$ $M$ – Step:

$$\begin{cases} \lambda_j = \dfrac{\sum_{k=1}^{|X_j|} \beta_j(x_k)}{|X_j|}, x_k \in X_j \\[2mm] \mu_j = \dfrac{\sum_{k=1}^{|X_j|} \beta_j(x_k) x_k}{\sum_{k=1}^{|X_j|} \beta_j(x_k)}, x_k \in X_j \\[2mm] \alpha_j = \dfrac{\sum_{k=1}^{|X_j|} \beta_j(x_k)(x_k - \mu_j)^T (x_k - \mu_j)}{\sum_{k=1}^{|X_j|} \beta_j(x_k)}, x_k \in X_j \end{cases} \quad (7)$$

Wherein, $$\beta_{j(x_k)} = p(j \mid x_k) = \dfrac{p(j \cap x_k)}{p(x_k)} = \dfrac{\alpha_j g(x_k; \mu_j, \sigma_j^2)}{\sum_{j=1}^{M} \alpha_j g(x_k; \mu_j, \sigma_j^2)}.$$

The invention conducts actual verification, there accumulated number total 183 vehicles including motorcycles, compact cars and large cars are observed and distributed on Lane 1 to Lane 4. FIG. 7 shows the statistical result of vehicles.

FIG. 6 shows the accumulated frequency information and the conflict information. The upper part is the accumulated frequency span information of 183 vehicles, which shows the accumulated times on every frequency domain. Between Lane 1 and Lane 2, the first conflict interval is from 23 to 25. Between Lane 3 and Lane 4, the second conflict interval is from 36 to 38. After the conflict information is treated by the invention, much more accurate accumulated frequency span information can be obtained.

Figure 8:
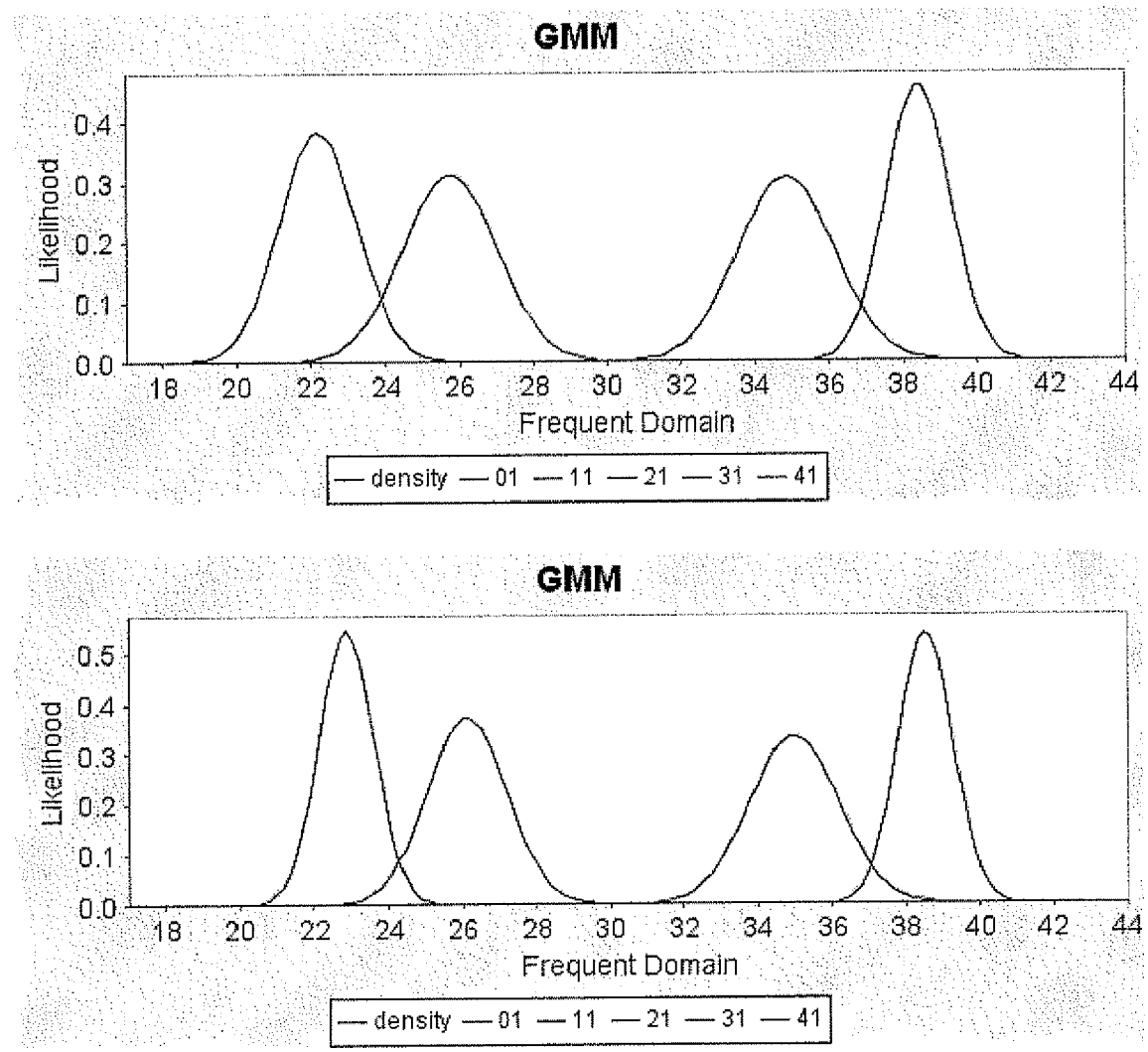
FIG. 8 shows the comparison diagram of Gaussian Mixture Model and Gaussian Mixture Model Variant.

In the comparison diagram of Gaussian Mixture Model and Gaussian Mixture Model Variant shown in FIG. 8, the upper part is the calculation result of original Gaussian Mixture Model, and the lower part is the calculation result of Gaussian Mixture Model Variant. It is known after the calculation of Gaussian Mixture Model Variant; it not only can increase the convergence speed, but also can reduce the variant of every parameter, to obtain much more accurate lane boundary information.

The invention employs the Gaussian Mixture Model Variant to form the calculation method of automatic learning, in order to identify suitable lane boundary position. The frequency span information is employed to reduce the misleading judgment for the unidentified lane area. And the faster and more precise calculation way is employed to identify the traffic lane boundary position, in order to get correct lane width.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for identification of traffic lane boundary by using the treatment of conflict information, comprising:
   receiving a microwave signal and said microwave signal being converted to a frequency domain information by Fourier Transformation, wherein;
   treating a noise reduction for the frequency domain information by filtering an unnecessary frequency domain information from said microwave signal;
   forming a frequency span information by employing a frequency domain information to calculate a plurality of closed intervals;
   checking whether a first distance between two of said closed intervals is smaller than a setting threshold value;
   checking whether a second distance of others of said closed intervals is smaller than said setting threshold value;
   checking all of said closed intervals and a single existed frequency domain alone;
   carrying out a treatment of conflict information in order to adjust said frequency span information; and
   identifying a traffic lane boundary by an accumulated frequency span.

2. The method according to claim 1, wherein said checking whether a first distance between two of said closed intervals is smaller than a setting threshold value comprises if it is not, two of said closed interval are as different said closed interval.

3. The method according to claim 1, wherein said checking whether a second distance of others of said closed intervals is smaller than said setting threshold value comprises if it is, a minimum said closed interval is formed.

4. The method according to claim 1, wherein said checking whether a second distance of others of said closed intervals is smaller than the threshold comprises if it is, a larger minimum said closed interval is formed to cover said closed interval and said frequency domain until no more other peak count is merged.

5. The method according to claim 1, wherein said checking all of said closed intervals and a single existed frequency domain alone comprises if said all of said closed intervals and said single existed frequency domain alone are smaller than said setting threshold value or larger than a maximum lane width, said all of said closed interval and said single existed frequency domain are deleted.

6. The method according to claim 1, wherein said carrying out the treatment of conflict information, comprising:
   comparing a boundary information of said closed intervals to obtain a conflict information.

7. The method according to claim 1, wherein said carrying out the treatment of conflict information, comprising:

$C_i = \min\{L[i], R[i]\}$, wherein $C_i$ represents the conflict information, $L[i]$, $R[i]$ are left and right boundary information formed by said accumulated frequency span information.

* * * * *